United States Patent Office 3,329,585
Patented July 4, 1967

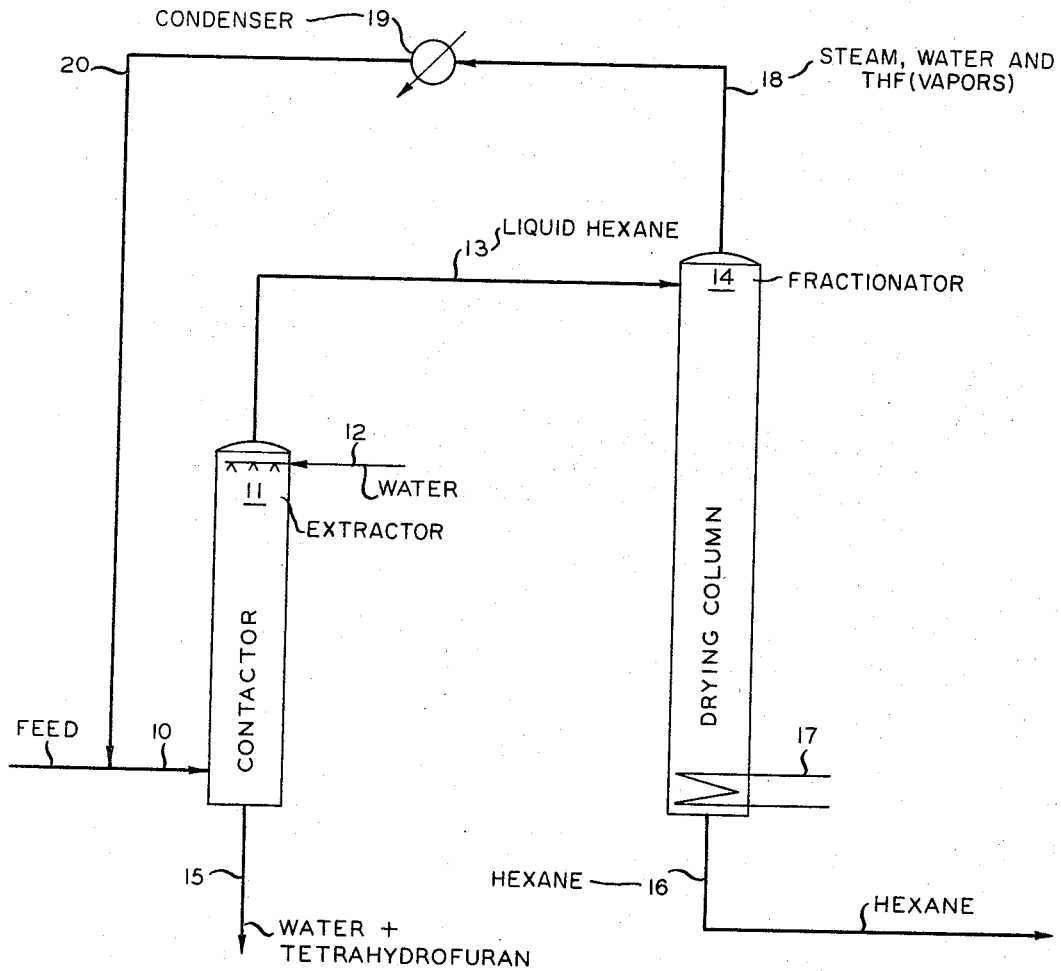

3,329,585
WATER EXTRACTION OF TETRAHYDROFURAN AND DISTILLATION OF RAFFINATE
Robert L. Huxtable, Bartlesville, Okla., assignor to Phillips Petroleum Company, a corporation of Delaware
Filed July 23, 1963, Ser. No. 297,104
5 Claims. (Cl. 203—39)

This invention relates to a method and apparatus for separating organic fluid mixtures. In another aspect, this invention relates to a method and apparatus for separating organic fluid mixtures wherein one of the constituents of said organic mixture has a greater affinity for water than the remainder of said organic mixture. In another aspect, this invention relates to a method and apparatus for separating an organic polar compound for a hydrocarbon.

In many instances, it is desirable to produce different rubber polymers employing a single polymerization process system. For example, it may be desirable to produce a random copolymer utilizing the rubber polymerization process system and at a subsequent time utilize the same rubber polymerization process system to produce a block polymer, employing the same hydrocarbon solvent in both rubber polymerization processes. In the production of a random copolymer, an additive consisting of an organic polar compound is employed in the polymerization reaction zone. This organic polar compound is detrimental to a block polymer polymerization process. Therefore, provision must be made to remove this organic polar compound from the hydrocarbon solvent employed in the random copolymer process before the hydrocarbon solvent can be utilized in the block polymer process.

Accordingly, an object of my invention is to provide a method and apparatus for separating constituents from organic fluid mixtures.

Another object of my invention is to provide a method and apparatus for separating organic polar compounds from hydrocarbon solvents.

Other objects, advantages and features of my invention will be readily apparent to those skilled in the art from the following description, drawing and appended claims.

The drawing is a schematic representation of one embodiment of the inventive process.

Although the invention will hereinafter be described as applied to a process for the separation of an organic polar compound from a hydrocarbon solvent, it is not intended that the invention should be limited thereto. The invention is applicable to the separation of a constituent from an organic fluid mixture wherein the said constituent has a greater affinity for water than for the remaining portion of the said organic mixture.

Broadly, I have provided a separation process wherein an organic fluid mixture containing a constituent having a greater affinity for water than for the remainder of said organic mixture is contacted with water in a contact zone; a stream substantially free of said constituent is withdrawn from said contact zone and passed to a drying zone; a substantially water-free organic fraction is withdrawn from the drying zone; a vaporous fraction is withdrawn from said drying zone; and water containing said constituent is withdrawn from said contact zone. In a second embodiment, the vaporous fraction withdrawn from said drying zone is mixed with the organic mixture feed to said contact zone and the combined mixture passed to said contact zone.

The term "affinity" as herein employed includes those instances wherein the constituent to be separated from the organic mixture distributes itself between the water phase and the organic phase, but the concentration in the organic phase is reduced by increasing the water to organic mixture ratio in the contact zone.

Referring to the drawing, the invention will hereinafter be described as applied to the specific separation of tetrahydrofuran (an organic polar compound) from the hydrocarbon solvent n-hexane. It is not intended that the invention should be limited thereto. A feed comprising 690,274 lbs./24 hours of n-hexane, 1,253 lbs./24 hours of tetrahydrofuran, and 462 lbs./24 hours of water is passed at a temperature of 100° F. via conduit means 10 to a lower region of extractor 11. Extractor 11 can be 3 feet in diameter and 14 feet in height, containing 6 feet of 1-inch Berl saddles. Water at 100° F. and at the rate of 3,340,000 lbs./24 hours is passed via conduit and dispersing means 12 to the upper region of extractor 11. Within extractor 11 the feed mixture is intimately contacted with the downward flowing water, the feed mixture flowing upwardly countercurrently to the flow of water within vertical extractor 11. A liquid stream comprising 834,274 lbs./24 hours of n-hexane, 137 lbs./24 hours of tetrahydrofuran (substantially free of tetrahydrofuran), and 557 lbs./24 hours of water is withdrawn from the upper region of extractor 11 via conduit means 13 and passed to a drying column 14. 3,340,462 lbs./24 hours of water containing 1233 lbs./24 hours of tetrahydrofuran is withdrawn from the bottom of extractor 11 via conduit means 15.

The feed to extractor 11 may be vaporous or liquid. If vaporous, a temperature is maintained within contactor 11 such that the vaporous feed will be condensed and liquid product streams withdrawn from extractor 11 in the previously described manner. A desired temperature within extractor 11 can be maintained by manipulating the temperature of the organic feed stream and/or the water feed to extractor 11.

The liquid n-hexane fraction withdrawn from extractor 11 is passed via conduit means 13 to the upper region of fractionation column 14, thereby acting simultaneously as a reflux and feed to fractionation column 14. Fractionation column 14 is heated by a heat exchange means 17 positioned in the lower region of column 14. A liquid organic fraction comprising 690,274 lbs./24 hours of n-hexane and 20 lbs./24 hours of tetrahydrofuran is withdrawn from the lower region of fractionation column 14 via conduit means 16 and a vaporous fraction comprising 557 lbs./24 hours of water, 117 lbs./24 hours of tetrahydrofuran, and 144,000 lbs./24 hours of n-hexane is withdrawn from the upper region of fractionation column 14 via conduit means 18. Fractionation column 14 can be operated, for example, at a top temperature of 176° F., a bottom temperature of 179° F., a top pressure of 20 p.s.i.a., and a bottom pressure of 21 p.s.i.a. Although not herein illustrated, the liquid withdrawn from contactor 11 via conduit 13 can be passed to a coalescer and the coalescer product stream preheated before passage to fractionation column 14.

It is within the scope of this invention to condense the vaporous fraction withdrawn from fractionation column 14 by means of a heat exchange means 19 and to recycle the condensed vaporous fraction via conduit means 20 and conduit means 10 to extractor 11. As illustrated by the drawing, the recycled fraction is premixed with the organic feed mixture to extractor 11. It is also within the scope of this invention to pass the recycled fraction directly to extractor 11. By recycling the vaporous fraction, any tetrahydrofuran remaining with the water passed from extractor 11 via conduit means 13 to fractionation column 14 is recycled to extractor 11 and withdrawn from extractor 11 via conduit means 15.

Various modifications of the invention can be made, or followed, in view of the foregoing disclosure without departing from the spirit or the scope thereof.

I claim:
1. Process for removing tetrahydrofuran from a hydrocarbon solvent comprising:
    countercurrently extracting a major proportion of the tetrahydrofuran from said solvent with water leaving an extracted solvent;

distilling the extracted solvent until substantially all residual water and substantially all of the tetrahydrofuran are removed overhead; and recovering substantially pure solvent as the bottom product of said distilling.

2. Process of claim 1 wherein said solvent has a boiling point below the boiling point of water.

3. Process of claim 1 wherein said solvent is hexane.

4. Process of claim 1 wherein the overhead from said distilling is recycled to said extracting.

5. Process of claim 4 wherein said overhead is condensed and admixed with said hydrocarbon solvent prior to said extracting.

References Cited

UNITED STATES PATENTS

| | | | |
|---|---|---|---|
| 2,319,694 | 5/1943 | Lee et al. | 203—44 |
| 2,506,858 | 5/1950 | Davidson | 203—44 |
| 2,580,403 | 1/1952 | Burton et al. | 260—705 X |
| 2,595,805 | 5/1952 | Morrell et al. | 203—82 X |
| 2,617,575 | 11/1952 | Michael | 203—82 X |
| 2,684,934 | 7/1954 | Weaver et al. | 203—82 X |
| 2,690,995 | 10/1954 | Steitz | 203—82 X |
| 2,695,867 | 11/1954 | Chambers | 203—14 X |
| 2,704,271 | 3/1955 | Harrison et al. | 203—76 X |

NORMAN YUDKOFF, *Primary Examiner.*

F. E. DRUMMOND, *Assistant Examiner.*